F. W. JOHNSTONE.
SHOCK ABSORBER FOR AUTOMOBILES.
APPLICATION FILED SEPT. 17, 1921.
1,437,146.
Patented Nov. 28, 1922.
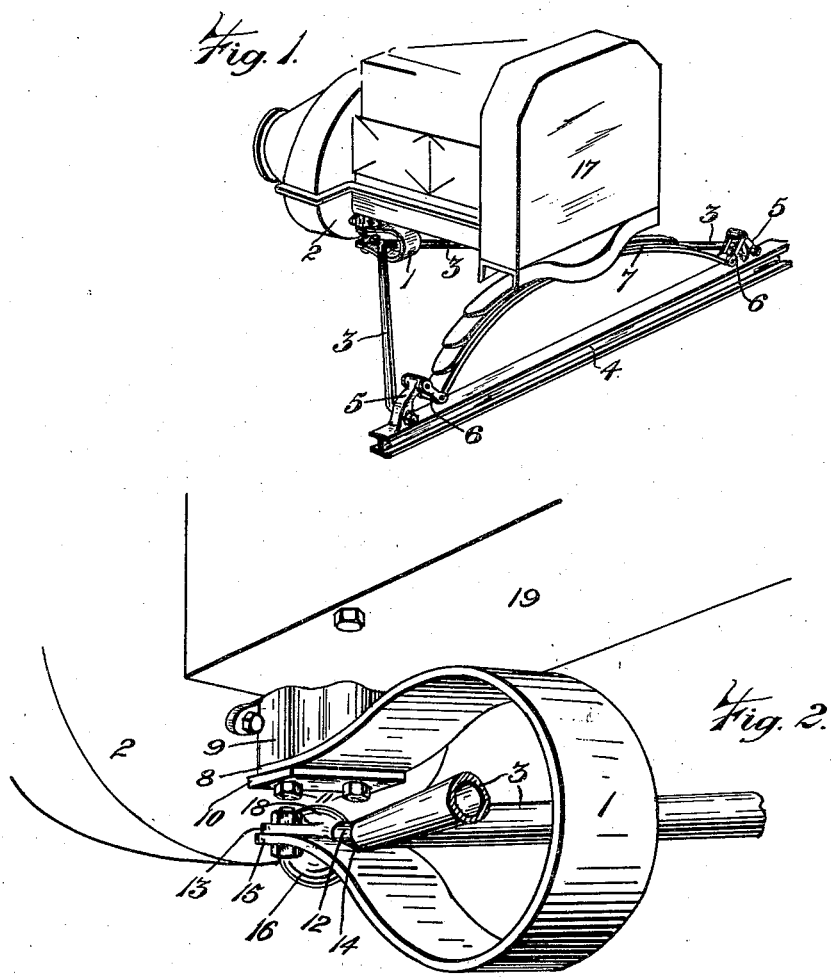
Inventor
F. W. Johnstone,
By Marks & Clerk
Attys.

Patented Nov. 28, 1922.

1,437,146

UNITED STATES PATENT OFFICE.

FREDRICK WILLIAM JOHNSTONE, OF MURRUMBURRAH, NEW SOUTH WALES, AUSTRALIA.

SHOCK ABSORBER FOR AUTOMOBILES.

Application filed September 17, 1921. Serial No. 501,254.

*To all whom it may concern:*

Be it known that FREDRICK WILLIAM JOHNSTONE, a subject of the King of Great Britain and Ireland, residing at Clarke Street, Murrumburrah, New South Wales, Australia, has invented certain new and useful Shock Absorbers for Automobiles, of which the following is a specification.

This invention relates to a spring check or shock absorber for use in connection with the front wheels of the "Ford" type of automobile which has the front axles linked by radial or torque rods to the variable speed gear case.

The invention has for its object to provide spring means associated with said rods and with the said case to enable shocks transmitted to the front wheels of the automobile occasioned by road inequalities to be readily absorbed by such spring means so that distortion or breakage of the rods and undue bouncing of the automobile will be avoided.

In the accompanying drawing, Fig. 1 is a view of the front portion of an automobile with shock absorber fitted thereto, and Fig. 2 is an enlarged detail view illustrating the construction of the spring and the manner of attaching the radius rods to the loose end thereof.

A spring 1 constructed of steel of suitable gauge is interposed between the variable speed gear case 2 and the rear ends of the radial or torque rods 3 which extend from the front axle 4 of the automobile. The forward ends of such rods are usually connected to arms 5 which are bolted to the axle 4; said arms carry shackles 6 to which the opposite ends of the semi-elliptic spring 7 are attached.

The spring 1 is bowed and one of its ends 8 is affixed to a bracket 9 or like support which is fastened to the exterior wall of the variable speed gear case 2. A metal plate 10 and bolts 11 may be utilized for securing the end 8 of the spring to the bracket 9. The other end 15 of the spring is loose and is provided with means adapted to act as a housing for a ball on an extension 12 of the rods 3, such rods being jointed together at 14 by welding or otherwise. Said housing may consist of a recess 16 formed by depressing the metal of the end 15 of the spring and by a plate 13, also formed with a recess 18; the plate is secured to the end 15 of the spring, so that the recess therein will overlie the recess 16 in such end, after the ball on the end of the rods 3 has been set into the latter recess. The said ball and housing form a ball-joint for the rear portions of the rods and permit a rocking movement thereof. In the drawing the numeral 17 indicates the casing of a radiator of any suitable type and the numeral 19 the bottom of the crank case.

As the free end 15 of the spring 1 carries the rear portion of the radius or torque rods 3 shocks to the front wheels of the automobile consequent on their meeting irregularities of the road are absorbed by said spring and excessive bouncing of the automobile and distortion or breakage of the rods 3 are thus obviated.

What I claim as my invention and desire to secure by Letters Patent is:—

1. A shock absorber for motor vehicles comprising in combination, a part carried by the frame of the vehicle and a radius rod having its front portions secured to the axle of the vehicle, a bowed spring having one end fixed to the part carried by the frame of the vehicle and its other end loosely connected to the rear portion of the radius rod, whereby shocks transmitted to the front wheels of the vehicle are absorbed by said spring.

2. A shock absorber for motor vehicles comprising in combination with a part carried by the frame of the vehicle and a radius rod having its front portions secured to the front axle and having its rear portion formed with a ball, of a bowed spring having its upper end connected to the part carried by the frame of the vehicle, and means coacting with the other end of the spring and forming a housing for engaging the ball on the rear portions of the radius rods, substantially as and for the purposes set forth.

3. A shock absorber for motor vehicles comprising in combination with a part carried by the frame of the vehicle and a radius rod having its front portions secured to the front axle of the vehicle, a ball formed on the rear portions of the radius rods of a bowed spring one end of which is rigidly fixed to the part carried by the frame of the vehicle, the other end of the spring being positioned opposite and beneath the rigidly fixed end and in proximity to the ball and means coacting with the last mentioned end of the spring and associated with the ball to form a ball-joint, substantially as and for the purposes set forth.

4. A shock absorber for motor vehicles comprising in combination with a part carried by the frame of the vehicle and a radius rod having its front portions secured to the front axle of the vehicle of a bowed spring one end of which is rigidly fastened to the part on the frame of the vehicle and which is positioned in proximity to the other end of the spring and means for loosely connecting the last mentioned end of the spring with the rear portions of the radius rod.

5. A shock absorber for motor vehicles comprising in combination with the transmission case carried by the frame of the vehicle and a radius rod having its front portions secured to the front axle of the vehicle and its rear end terminating in a ball, of a bowed spring, a bracket associated with one end of the spring and secured to the transmission case, the opposite end of the spring being formed with a depression for association with the ball, a plate having a depression and fitted over and connected to the depressed end of the spring for coacting therewith and forming a ball-joint housing for the ball, substantially as and for the purposes set forth.

6. A shock absorber for motor vehicles comprising in combination with a transmission casing carried by the frame of the vehicle and a radius rod the front portions of which are connected to the front axle of the vehicle and the rear portion terminating in the ball of a bracket secured to the transmission casing and having one end of the spring rigidly connected thereto the opposite end of the spring being positioned beneath the bracket and the ball and formed with a recess for partially receiving the ball, a plate having a recess, means for securing the plate to the free end of the spring so that the recesses in the spring and plate coact with each other to form a housing for the ball whereby shocks transmitted to the front wheels of the vehicle are absorbed by said spring.

7. A shock absorber of the character described, a bowed spring having the free ends arranged in proximity to each other, one of the ends of the spring being relatively flat and provided with openings to facilitate attachment and the opposite end of the spring being formed with a semi-circular depression, substantially as and for the purposes set forth.

In testimony whereof I affix my signature.

FREDRICK WILLIAM JOHNSTONE.